3,060,160
METHOD AND CONTROL SYSTEM FOR
EMULSION POLYMERIZATION
Gabriel Xavier Roger Boussu, Chamalieres, and Louis Pierre François André Neuville, Louis Henri Noël Saint-Frison, and Pierre Marie René Laurent Peignier, Clermont-Ferrand, France, assignors to Michelin & Cie, Clermont-Ferrand, France
No Drawing. Filed June 29, 1959, Ser. No. 823,358
Claims priority, application France Oct. 7, 1958
12 Claims. (Cl. 260—88.3)

The present invention relates to emulsion polymerization processes for the production of synthetic elastomers, and it relates more particularly to a new initiating and control system for facilitating the polymerization and copolymerization of dienic hydrocarbons (butadiene and its homologues), styrene, vinylpyridine, chloroprene and their homologues, and vinyl chloride.

The effect of organic halides and polyhalides on the rate of polymerization of dienic hydrocarbons, such as butadiene, isoprene and dimethylbutadiene, has already been observed, but these halides, when employed alone, even in relatively high concentrations, have never produced conversion, polymerization or copolymerization rates high enough to produce synthetic elastomers at low temperatures.

In accordance with the present invention, we have provided systems in which polymerization or copolymerization is accelerated and made possible in reasonable periods of time even at low temperatures by including in the system an organic halide, a nitrogen base, a reducing agent, and a small amount or trace of copper which performs the function of catalyst.

The organic polyhalide used in the new system is of the structural formula $C_nX_{2n+2}$, X being a halogen (Cl or Br) and $n$ being between 1 and 3, so that the invention concerns more especially the use of $CCl_4$, $C_2Cl_6$ and $C_3Cl_8$ and the corresponding bromides. The polyhalide is present in the system in an amount of from about 0.2% to 5% of the weight of the monomer, and preferably from about 0.8% to 1.6%, which is appreciably lower than the concentration employed in the prior processes.

Copper is introduced into the system in any form which enables it to attain, in the aqueous phase of the emulsion, an ion concentration of from 3 to 150 mg. per 100 litres, and preferably from 20 to 80 mg. per 100 litres. In practice, the copper will be present in the system as a soluble copper salt, but it can also be metallic copper.

The reducing agent present in the system is an organic or mineral reducing agent which is water-soluble in basic medium and capable of reducing the copper compound to metallic copper or copper hydride. Typical reducing agents are the hydrosulphites, hypophosphites, formaldehyde, semi-carbazide and hydrazine. The presence of a reducing agent is essential to the activity of the system, that is to say, to the development of an industrially acceptable conversion, polymerization or copolymerization rate. Normally, the reducing agent is present in excess of that theoretically required to reduce one halogen atom per halide molecule to the ionic state. Thus, for example, 0.25 mol. of hydrazine is the theoretical equivalent of one mol. of $CCl_4$. In practice, 0.7 mol. of hydrazine will be used. The proportion of reducing agent can be increased, for example, trebled, without detriment to the polymerization. In the absence of the reducing agent, the conversion rate is appreciably slowed or even stopped.

The system according to the invention also includes a water-soluble nitrogen base having a dissociation constant higher than $10^{-6}$, which must not form an excessively stable complex with the copper. For economy, a base is employed which is recoverable at the end of the operation, by distillation, for example, azeotropic distillation. Ammonia and the aliphatic or heterocyclic amines, such as piperidine are suitable nitrogen bases. The proportion of the base which is employed is fairly high, but it can be varied considerably depending on the particular basic compound which is used. For example, with $NH_3$, the rate of polymerization or copolymerization is highest at about a 5 N concentration in the aqueous phase. It is undesirable to reduce the normality below 1 or to increase it above 10. With piperidine, the proportion is substantially smaller and may vary from N/20 to 2 N, the best results being obtained between 0.5 N and N. In any case, the concentration of the nitrogen base is in the range from N/20 to 10 N. Mixtures of various nitrogen bases may be employed, if desired.

Summarizing the general conditions obtaining in accordance with the invention, the emulsion polymerization system will include at least one polymerizable monomer of the above-mentioned class; about 0.2% to 5% and preferably from 0.8% to 1.6%, by weight, calculated on the monomer, of a polyhalide of the type $C_nX_{2n+2}$, $n$ being between 1 and 3, and X designating Cl or Br; from 3 to 150 and preferably from 20 to 80 mg. of ionic copper per 100 litres of solution; an excess of a water-soluble reducing agent capable of reducing copper to the form of metal or a metallic hydride in a basic medium having a pH higher than 8, and preferably higher than 12; and a water-soluble nitrogen base having a dissociation constant higher than $10^{-6}$.

Although copper may be used alone in the system, it is advantageously associated with at least one other heavy metal, such as iron, manganese, cobalt, vanadium or lead. The heavy metal may be present in an amount between about 1 and 6 times the amount of copper present in the emulsion. In practice, a solution of compounds of the heavy metals will be employed and the solution may contain an agent forming a rather imperfect complex with metals, such as tartaric acid, citric acid, the sugars or a pyrophosphate.

Moreover, the system in accordance with the invention must contain an emulsifying agent which may be used in basic medium, such as a soluble salt of fatty acid, for example, sodium oleate or ammonium oleate, or potassium stearate, in the quantity generally employed in emulsion polymerization.

The new system provides high conversion rates, making possible the production of synthetic elastomers, such as cold rubber, at low temperatures. Moreover, it has the advantage of making possible operation at higher temperatures without appreciably detracting from the quality of the polymer, as will be apparent from the illustrative examples given hereinafter.

Another advantage of this system is that it assures a precise and extensive control of the plasticity of the final polymer. The following table shows the simultaneous influence of the polyhalide and of the copper, both of which are required for attaining the desired effect. The table illustrates the results obtained in the polymerization of butadiene at 20° C., employing a formula of the type mentioned in Example 6 set forth hereinafter, with a degree of conversion of 90%.

TABLE I

| $CCl_4$ in percent of the monomer | Cu in percent of the monomer | Mooney plasticity |
|---|---|---|
| 2.5 | 0.00004 | 91 |
| 2.5 | 0.00015 | 9 |
| 2.5 | 0.00010 | 12 |
| 2.0 | 0.00010 | 49 |

3

In addition, by virtue of this property of the system, it is possible to vary not only the mean molecular weight, but also the distribution of the individual molecular weights in the polymer or copolymer as a whole. For example, the use of an excess of halide, in combination with a very small amount of copper, tends to render the conditions uniform throughout the entire reaction. On the other hand, a small amount of halide, balanced by a higher copper content, produces shorter macromolecules at the beginning of the reaction period, and longer macromolecules at the end of the reaction period. Exaggeration of the latter tendency will result in premature stoppage of the conversion due to total exhaustion of the halide present. In contrast thereto, with a sufficient amount of halide, the regulating effect is sufficiently sustained to permit raising the conversion to values in the neighborhood of total transformation without any crosslinking of the polymer.

Control of this method of regulation permits substantial reduction of the amount of styrene required in the production of butadiene-styrene copolymers, and styrene can even be omitted and butadiene rubbers produced which have the rubber working properties of butadiene-styrene rubbers.

A further advantage of the use of the system according to the invention is that it permits employment of crude monomers not separated from their stabilizing agents. For example, tert.-butylcatechol and hydroquinone and its derivatives, which are commonly employed for the preservation of monomers, do not in any way interfere with polymerization. Therefore, they need not be separated beforehand. The anti-oxidant intended for the final polymer may even be introduced into the monomers. This is the case more especially with α- or β-phenylnaphthylamines, the incorporation of which is thus very simply effected.

Polymerization or copolymerization can be stopped in the usual way by the addition of a dithiocarbamate, but the new system is such that the reaction can be stopped readily and economically in another way. Formation of a complex compound of the copper catalyst by the addition of a small excess of a highly active complex-forming agent, for example, an alkali metal or alkaline earth metal cyanide, stops the reaction promptly. Inasmuch as copper is present in only a minute quantity, a very small amount of cyanide is sufficient.

If desired, it is possible subsequently to reactivate the reaction, by adding further copper.

The following examples are illustrative of typical processes embodying the invention.

EXAMPLE 1

0.7 part of hexachloroethane and 3.5 parts of oleic acid are dissolved in 100 parts of isoprene. In addition, 100 parts of ammonia (22° Bé.) are diluted in 100 parts of water containing 0.2 part of hydrazine hydrate, 0.00035 part of copper sulphate pentahydrate, 0.002 part of ferrous sulphate heptahydrate and 0.03 part of tartaric acid, all parts being by weight. The two solutions are mixed and agitated in a closed vessel at a temperature of 20° C. After 24 hours, the reaction is 75% complete.

The action of the several components of the system will be clear from the following observations.

If hexachloroethane is eliminated from the system, no polymerization takes place.

If the metallic catalyst (copper) is eliminated, polymerization is scarcely detectable.

If hydrazine is eliminated, polymerization takes place about 30 times slower than when it is present.

If the ammonia is replaced by 0.7 part of caustic soda, polymerization is about 1/10 as fast and an intermediate gelling of the latex occurs.

If the hydrazine is replaced by 0.35 part of sodium hypophosphite, the conversion takes place only half as fast and the resulting latex is less pure.

4

If the hydrazine is replaced by 6 parts of hexamethylenetetramine, the conversion is about 1/6 as fast.

EXAMPLE 2

The procedure of Example 1 is followed but ammonia is replaced by a solution of 7 parts of piperidine diluted in 100 parts of water. After 24 hours at 20° C., the conversion reaches 92%. The resulting gum includes 0.17% organic chlorine. Its infra-red spectrum shows a characteristic absorption band at 13.6μ. Its cracking releases hydrochloric acid which is readily evidenced.

The result is substantially the same when piperidine is replaced by 8 parts of N-methylpiperidine.

The speed of the reaction is maintained if the iron in the formula is replaced by cobalt, manganese or vanadium. Lead gives only 50% conversion in the same period of time.

If the copper salt alone is used as the metallic catalyst, the conversion in 24 hours drops to 10%.

In the complete absence of copper, the conversion is substantially nil, even in the presence of the other metals.

When hexachloroethane is replaced by carbon tetrachloride, the conversion reaches 86% after 24 hours. The concentration or organic chlorine in the gum amounts to 0.30% and the corresponding band in the infra-red spectrum lies at 14.1μ.

Carbon tetrabromide likewise produces 78% conversion.

Symmetrical dibromotetrachloroethane produces 25% conversion.

EXAMPLE 3

Into an autoclave are introduced 200 parts of water, 12 parts of piperidine, 0.2 part of hydrazine hydrate, 0.9 part of caustic soda, 0.0003 part of copper sulphate pentahydrate, 0.0005 part of ferrous sulphate heptahydrate, 0.0002 part of cobalt chloride hexahydrate and 0.005 part of tartaric acid. A vacuum is formed in the apparatus, whereafter there are introduced under pressure 74 parts of 98% butadiene containing 100 millionths of tert.-butylcatechol. Finally, 1 part of β-phenylnaphthylamine, 3.3 parts of oleic acid and 1.2 parts of carbon tetrachloride, are introduced, all these products being dissolved in 26 parts of styrene containing 15 millionths of tert.-butylcatechol. The mixture is agitated for 10 hours, the temperature being maintained at 21° C. The formation of latex is stopped by the addition of 0.01 part of sodium cyanide. The piperidine is recovered together with the excess of monomers by steam distillation in a stripping column. The resulting latex is immediately subjected to acid coagulation, washed and dried. There are obtained 86 parts of gum completely soluble in benzene, having a Mooney plasticity of 58 and containing 21% of combined styrene. The resulting gum contains 0.26% organic chlorine which is partially released by cracking as HCl. As compared with a commercial blended styrene-butadiene rubber 1500 of the tire tread type, the product had an equally high modulus at 250% elongation, 9% higher hysteresis and 7% greater road life.

EXAMPLE 4

The procedure of Example 3 is followed, but the temperature is maintained at 7° C. for 25 hours, whereafter the pressure in the autoclave was reduced to 400 mm. Hg. 97 parts of rubber was produced which was entirely soluble in benzene, had a Mooney plasticity of 40 and contained 23% of combined styrene. The properties of the rubber, after vulcanization, are similar to those of the rubber produced as described in Example 3. It contains 0.31% organic chlorine.

EXAMPLE 5

The procedure of Example 4 is followed, the styrene being replaced by 2-vinylpyridine freshly distilled in vacuo. The conversion is a little slower and reaches 82% in 32 hours. The latex obtained is particularly suitable for the preparation of coating medium for cords of pneumatic tires.

EXAMPLE 6

The autoclave is charged with 200 parts of water, 12 parts of piperidine, 0.25 part of hydrazine hydrate, 1.2 parts of sodium hydroxide, 0.00075 part of copper sulphate, 0.0013 part of ferrous sulphate, 0.0005 part of cobalt chloride, 0.012 part of tartaric acid, 4 parts of oleic acid, 2.1 parts of carbon tetrachloride, 1 part of α-phenylnaphthylamine and 100 parts of butadiene not separated from its stabilizing agent. The mixture is agitated for 10 hours at 20° C. The reaction is stopped with 0.0015 part of cyanide. When treated as in Example 3, the product obtained is 84.5 parts of gum entirely soluble in benzene, having a Mooney plasticity of 29, which is very easy to work. It contains 1.05% organic chlorine. Its infra-red spectrum shows no characteristic band below 15μ. If, in this example, $CCl_4$ is replaced by $C_2Cl_6$, the resulting gum presents on the other hand, a characteristic absorption band at 12.4μ.

EXAMPLE 7

The same procedure is adopted as above with 190 parts of water, 12 parts of piperidine, 0.15 part of hydrazine hydrate, 0.9 part of sodium hydroxide, 0.00075 part of copper sulphate, 0.0015 part of ferrous sulphate, 0.0005 part of cobalt chloride, 0.001 part of tartaric acid, 27 parts of styrene, 1 part of β-phenyl-naphthylamine, 3.6 parts of oleic acid, 1.25 parts of carbon tetrachloride and 73 parts of butadiene. The mixture is agitated for 9 hours at 25° C. After treatment of the latex as in Example 3, 85 parts of very soft gum having a Mooney viscosity of 12 was obtained. The organic chlorine in said gum amounts to 0.72%.

An identical operation in which, however, the copper sulphate is reduced to 0.00027 part, produced 86 parts of a much firmer gum having a Mooney plasticity of 60, which is completely soluble in benzene. The organic chlorine is reduced to 0.26%.

On reduction of the copper sulphate to 0.00004 part, the conversion slows down and a partially insoluble gum is produced. The organic chlorine content in the latter is reduced to only 0.06%.

These examples show the influence of the copper content of the system on the plasticity of the polymer.

EXAMPLE 8

The procedure of Example 3 is followed, the oleic acid being replaced by the same weight of stearic acid and the sodium hydroxide by the equimolecular quantity of potassium hydroxide. After agitation for 9 hours at 25° C., there is obtained a homogeneous latex from which 97 parts of a soluble gum having a Mooney plasticity of 73 is derived.

EXAMPLE 9

The same procedure is followed as in Example 3, using as the monomer to be polymerized 60 parts of 3-methyl-2-chloroprene. At 20° C., the conversion is rapid and gives in 2½ hours a homogeneous latex, from which 55 parts of polymer entirely soluble in benzene are isolated by coagulation.

EXAMPLE 10

This example shows the effectiveness of the stoppage by complex formation by means of cyanide. The charge comprises 100 parts of isoprene, 0.7 part of carbon tetrachloride, 3.5 parts of oleic acid, 13 parts of piperidine, 0.25 part of hydrazine hydrate, 0.001 part of copper sulphate, 0.002 part of ferrous sulphate, 0.0007 part of cobalt chloride, 0.02 part of tartaric acid, 0.9 part of sodium hydroxide and 200 parts of water. At 20° C., the conversion reaches 20% in 2½ hours. 0.0003 part of sodium cyanide is then introduced. The conversion is immediately stopped and no further conversion occurs throughout the following day.

EXAMPLE 11

Application to Polystyrene

The same formula is employed as in Example 10, the 100 parts of isoprene being replaced by 130 parts of styrene not separated from its stabilizing agent. At 20° C., the conversion is substantially complete in 2 hours. The obtained latex is homogeneous and, on coagulation, liberates the polystyrene in pulverulent form, in which it can be filtered through a cloth and washed without loss. On drying at low temperature, a light powder is obtained, which is readily soluble in benzene to give a limpid solution.

EXAMPLE 12

Application to Polyvinyl Chloride

The same formula is used as in Example 10, the 100 parts of isoprene being replaced by 110 parts of vinyl chloride. The emulsion is maintained at about 2° C. with good agitation. The conversion is substantially complete in 8 hours. The resulting latex is partially flocculated. Acidulation causes separation of the polymer in a pulverulent form in which it can readily be washed and dried.

From the preceding examples it will be clear that systems of the type embodying the present invention are capable of accelerating the conversion rate of monomers of the types described at low temperatures and of enabling a close control of the properties of the polymers or copolymers produced therefrom, either at low or higher temperatures. Considerable flexibility in the proportions of the components of the system and in the components themselves is possible, as indicated above, and accordingly, the examples given should be considered as illustrative.

We claim:

1. An emulsion polymerization process providing precise control of the plasticity of the polymer comprising forming of an aqueous suspension consisting essentially of at least one monomer selected from the group consisting of the dienic hydrocarbons, styrene, vinylpyridine, chloroprene, their homologs and vinyl chloride; a polyhalide of the type $C_nX_{2n+2}$, wherein $n$ is between 1 and 3 and X is selected from the group of halogens consisting of chlorine and bromine, the ratio of said polyhalide being approximately 0.2% to 5% in relation to the weight of the said monomer; copper in the ratio of 3 to 150 mg. copper ion per 100 liter of water in the forementioned emulsion; a reducing agent of the type capable of reducing the copper ion to metallic copper and a nitrogenous base having a dissociation constant of at least $10^{-6}$ and not forming a stable complex with copper; and maintaining said emulsion at a temperature promoting polymerization.

2. The process set forth in claim 1 in which the polyhalide is a carbon tetrachloride.

3. A process according to claim 1 in which the proportion of the said polyhalide is between about 0.8% and 1.6% based on the weight of the monomer.

4. The process set forth in claim 1 in which said reducing agent is water-soluble and reduces copper salts to metallic copper in an alkaline medium.

5. The process set forth in claim 4 in which the reducing agent is hydrazine.

6. The process set forth in claim 1 in which the pH of the emulsion is at least about 8.

7. The process set forth in claim 1 in which said nitrogenous base is selected from the group consisting of ammonia and piperidine.

8. The process set forth in claim 1 in which said emulsion contains a water-soluble compound of at least one heavy metal selected from the class consisting of iron, manganese, cobalt, vanadium and lead in the proportion of from 1 to 6 times the quantity of copper in said emulsion.

9. The process set forth in claim 8 in which said compounds of said heavy metals are salts of these metals.

10. The process set forth in claim 8 in which said emulsion contains an agent forming with said heavy metal a complex of low stability selected from the group consisting of tartaric acid, citric, acid, the sugars and the pyrophosphates.

11. The process set forth in claim 1 in which polymerization is terminated by introduction into the emulsion of an agent forming a complex ion compound with copper.

12. The process set forth in claim 11 in which said agent forming a complex ion compound with copper is an alkali cyanide.

References Cited in the file of this patent

UNITED STATES PATENTS

| | | |
|---|---|---|
| 1,926,039 | Downing et al. | Sept. 12, 1933 |
| 2,234,204 | Starkweather et al. | Mar. 11, 1941 |
| 2,440,800 | Hanford et al. | May 4, 1948 |
| 2,685,576 | Fryling et al. | Aug. 3, 1954 |
| 2,686,775 | Howard | Aug. 17, 1954 |